United States Patent

Wheatley

[15] 3,687,155
[45] Aug. 29, 1972

[54] CHECK VALVE
[72] Inventor: Charles Wheatley, Tulsa, Okla.
[73] Assignee: Charles Wheatley Company, Tulsa, Okla.
[22] Filed: March 5, 1970
[21] Appl. No.: 16,638

[52] U.S. Cl. ............... 137/268, 137/527.4, 137/375, 137/527.8
[51] Int. Cl. ............................................. F16k 15/03
[58] Field of Search ......... 137/268, 544, 527.2, 375, 454.2, 137/527.6; 15/104.06 A; 251/306, 314

[56] References Cited

UNITED STATES PATENTS

| | | | |
|---|---|---|---|
| 2,969,492 | 1/1961 | Wheatley | 137/527.4 |
| 1,742,043 | 12/1929 | McGee | 137/527 |
| 3,450,151 | 6/1969 | Heutzenroeder | 137/375 |
| 904,852 | 11/1908 | Dwyer | 137/375 |
| 2,578,590 | 12/1951 | Perrault | 137/527.8 X |
| 3,191,619 | 6/1965 | Allen | 137/527.4 |
| 1,561,395 | 11/1925 | Adams | 137/527.2 |
| 2,676,609 | 4/1954 | Pfarrer | 137/375 |
| 2,925,827 | 2/1960 | Anderson et al. | 137/527.4 |
| 3,075,547 | 1/1963 | Scaramucci | 137/527.4 X |

Primary Examiner—M. Cary Nelson
Assistant Examiner—Robert J. Miller
Attorney—William S. Dorman

[57] ABSTRACT

A check valve particularly constructed for permitting movement of a pipeline spheroid or "pig" therethrough in either direction. The valve is provided with means for reducing expansion of the spheroid upon entry thereof into the body of the valve and for reducing the spheroid to the pipeline size for facilitating passage or discharge of the spheroid from the valve.

1 Claim, 3 Drawing Figures

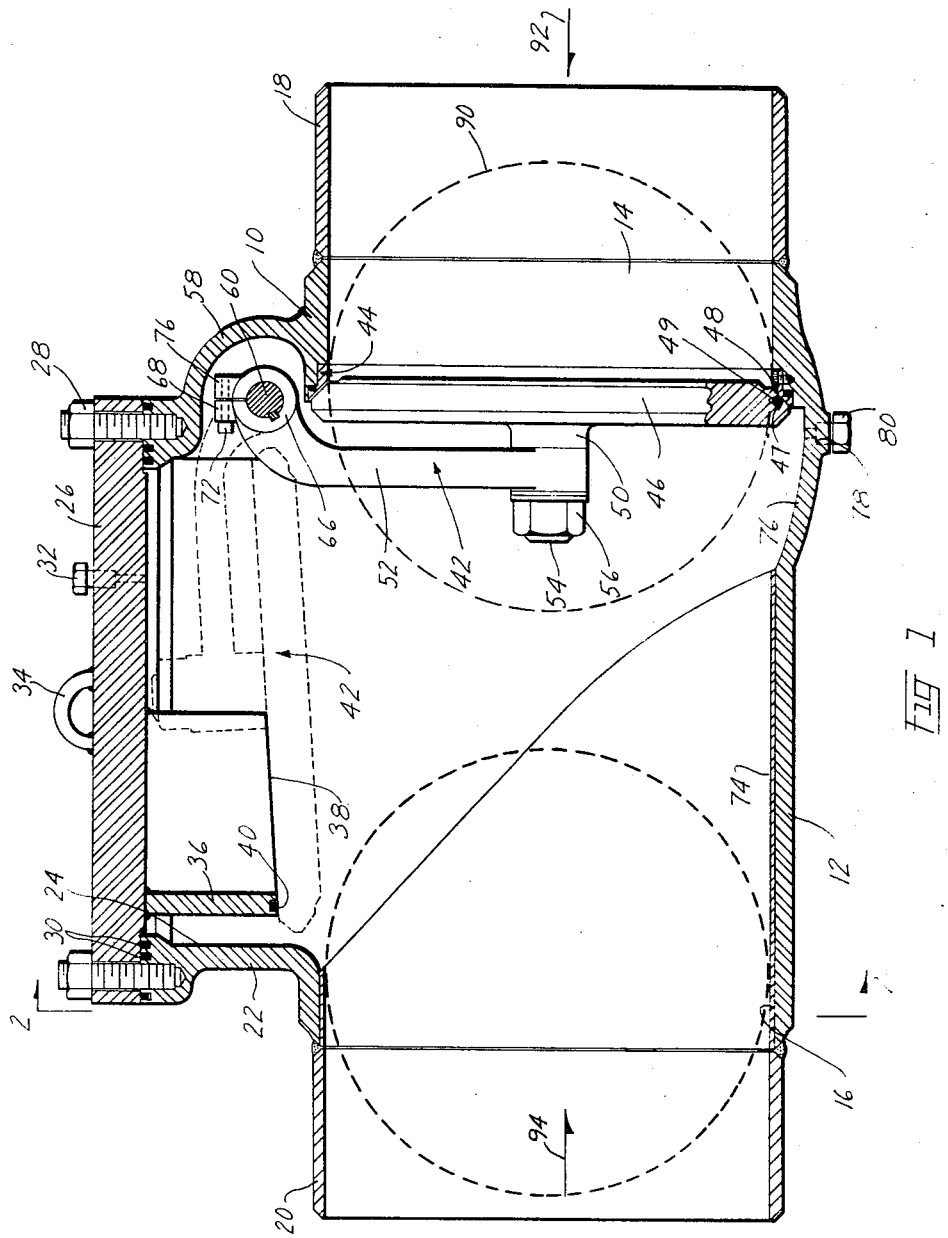

INVENTOR.
CHARLES WHEATLEY
BY
William S. Dorman
ATTORNEY

CHECK VALVE

This invention relates to improvements in valves and more particularly, but not by way of limitation, to a check valve particularly designed and constructed for facilitating movement of a spheroid therethrough in either direction.

In the initial installation of a pipeline, the line is usually filled with water for hydrostatic testing thereof prior to placing the pipeline in service.

Subsequent to this testing procedure the pipeline is cleared of the water. When the pipeline is disposed under water, and particularly under sea water, it is the normal practice to force the water from the line in a direction toward the body of water rather than for discharge on the land surface. In order to clear the water from the line a spheroid or pipeline "pig" is usually run through the line in a reverse direction to force the water through the line for discharge therefrom. The "pig" is normally of a somewhat flexible or yieldable construction and is oversized or of an outer cross sectional area slightly greater than the inner cross sectional area of the pipe. This assures a relatively snug or tight engagement therebetween to efficiently force the liquid or water from the pipe. Valves interposed in the pipe line usually have a larger cavity or cross sectional area within the body thereof than the internal cross sectional area of the pipeline. As a consequence, when the spheroid enters a valve it may expand, and it is necessary to swedge the spheroid back to the pipeline size as it leaves the valve in order to preclude lodging of the spheroid in the valve body.

The present invention contemplates a novel check valve having an internal sleeve member or insert whereby a large portion of the interior cavity of the valve body is maintained substantially equal in cross sectional area to the cross sectional area of the pipe line in order to reduce expansion of the "pig" or spheroid entering the valve. In addition, a tapered shoulder is provided in the valve for swedging the spheroid back into a size complementary to the pipeline interior for facilitating release of the spheroid from the valve. Thus, the valve is particularly designed and constructed for facilitating the passage of spheroids through a pipeline in a reverse direction during clearing of liquid from the line.

It is an important object of this invention to provide a novel check valve for facilitating movement of a spheroid through a pipeline in either direction.

It is another object of this invention to provide a novel check valve wherein a portion of the internal cross sectional area thereof is substantially equal to the cross sectional area of the pipe line for reducing expansion of a spheroid entering the valve body.

Another object of this invention is to provide a novel check valve wherein the size of an expanded spheroid is reduced upon discharge thereof from the valve body for facilitating movement of the spheroid through a pipeline in a reverse direction.

A still further object of this invention is to provide a novel check valve which is simple and efficient in operation and economical and durable in construction.

Other and further objects and advantageous features of the present invention will hereinafter more fully appear in connection with a detailed description of the drawings in which:

FIG. 1 is a sectional elevational view of a check valve embodying the invention.

Figure 3:
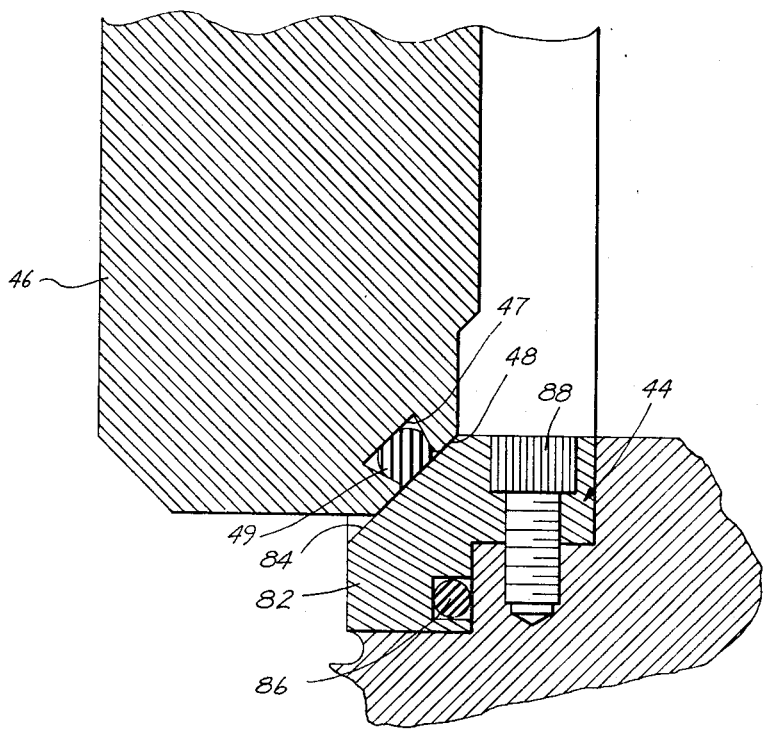
FIG. 3 is an enlarged sectional view of a valve seat and a portion of the valve closure member embodying the invention.

Referring to the drawings in detail, reference character 10 generally indicates a check valve comprising a body or housing 12 having opposed ports 14 and 16 providing a flow passageway therethrough as is well known.

A pair of sleeves 18 and 20 may be welded or otherwise secured to the ports 14 and 16, respectively, whereby the valve 10 may be welded in a pipeline (not shown). Of course, the valve 10 may be threaded at the opposite ends thereof in lieu of the sleeves 18 and 20, if desired, or the opposite ends of the valve 10 may be provided with flanges (not shown) for bolting the valve in the pipeline as is well known.

An upstanding neck portion 22 is provided on the body 12 to provide an access port 24 for the interior of the valve 10. A cover member 26 is removably secured to the access port 24 in any suitable manner such as by a plurality of bolts 28. A plurality of sealing members 30 are interposed between the neck 22 and cover 26 for precluding leakage of fluid therebetween. In addition, a safety vent or blow down fitting 32 may be provided for the cover 26 and in communication with the interior of the body 12 for relieving pressure, or the like. A suitable handle member 34 may be provided on the cover 26 for facilitating installation of and removal of the cover for the port 24.

In addition, a bumper member 36 is provided on the inner surface of the cover 26 for a purpose as will be hereinafter set forth. The bumper 36 is preferably of a substantially semi-cylindrical configuration and the lower edge portion 38 thereof is tapered inwardly as particularly shown in FIG. 1. A yieldable bumper element 40 is provided on the lower edge 38 of the bumper 36 for reducing shock in a manner and for a purpose as will be hereinafter set forth.

A closure member generally indicated at 42 is pivotably secured within the body 12 for cooperation with a valve seat member 44 to provide alternate ope and closed positions for the valve 10. As depicted herein the closure member 42 comprises a substantially circular disc member 46 having the outer periphery thereof tapered as shown at 48. A groove 47 of a substantially dove-tail cross sectional configuration extends around the tapered edge 48 for receiving a suitable sealing member 49 therein. A centrally disposed boss member 50 extends axially outwardly from the rear surface of the disc 46 for receiving one end of an angular support arm 52 thereon. The outer end 54 of the boss 50 may be threaded for receiving a lock nut 56 to retain the disc 46 secured to the arm 52.

Figure 2:
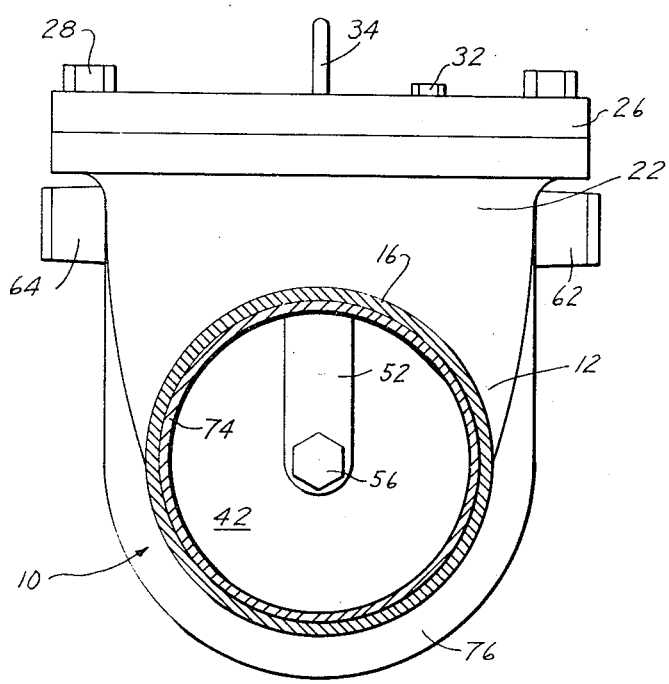
FIG. 2 is a sectional view taken on line 2—2 of FIG. 1.

A bulge portion 58 is provided in the neck portion 22 to provide clearance for a pivotal shaft 60. The shaft 60 extends transversely through the neck 22 and the opposite ends thereof are suitable journalled in oppositely disposed aligned projection members 62 and 64 (FIG. 2). Suitable actuator members (not shown) may be provided in connection with the projection members 62 and 64 as is well known for transmitting rotation to the shaft 60 for a purpose as will be hereinafter set forth. The outer end of the arm 52 is provided with an apertured member or sleeve 66 which may be keyed or otherwise secured around the shaft 60 for rotation simultaneously therewith. The sleeve 66 may be split at the upper portion thereof as shown in FIG. 1 and provided with complementary flanges 68 and 70 for receiving a thread member 72 therethrough to tighten the engagement of the sleeve 66 around the shaft 60.

The shaft 60 is freely journalled within the body 12 as herein set forth in order that the closure member 46 may freely move with respect to the valve seat to provide opening and closing of the valve 10 as is well know in check valves. The fully closed position of the closure 42 against the seat 44 is shown in solid lines in FIG. 1 and the fully opened position of the closure member 42 is shown in dotted lines in FIG. 1. The bumper 36 limits the pivoting or movement of the closure member 42 in the opening direction and the bumper element 40 absorbs substantially all of the shock as the disc member 46 engages the bumper 36 thus reducing noise and substantially eliminating damage to the disc 46.

The inner diameter of the sleeves 18 and 20 are normally substantially equal to the inner diameter of the pipeline (not shown) in which the valve 10 is installed. The inner diameter of the port 14 is normally of a diameter corresponding to the inner diameter of the pipeline. It is to be noted, however, that the diameter of the port 16 is normally larger than the inner diameter of the pipeline. Accordingly, sleeve member, or liner, 74 is inserted within the port 16 and extends inwardly into the valve body 12 with the upper portion thereof terminating in substantial alignment with the port 24 and the lower portion thereof terminating conterminously with a bulbous portion or cavity 76 provided in the body 12 in the proximity of the valve seat 44.

A drain port 78 is provided in the cavity 76 for draining any accumulated fluid from the interior of the body 12. A plug member 80 is provided for the port 78 for precluding leakage of fluid therefrom during normal use of the valve 10.

Referring now to FIG. 3 an enlarged view of the valve seat 44 and tapered edge 48 of the closure disc 46 is shown. The valve seat 44 comprises an annular body member 82 having a tapered edge 84 complementary to the tapered edge 48 to provide a seating engagement between the valve seat 44 and the closure disc 46. The inwardly directed end of the port 14 in the proximity of the closure member 42 is of a substantially stair-shaped cross sectional configuration as particularly shown in FIG. 3 and the outer periphery of the body 82 is of a substantially stair-shaped cross sectional configuration for engagement therewith. A suitable sealing member 86 such as an O-ring or the like is interposed between the body 82 and housing 12 for precluding leakage of fluid therebetween. THe body 82 is removably secured to the inwardly directed stair-shaped portion of the port 14 by a plurality of threaded studs 88. The tapered portion 84 of the seat 44 is particularly designed for facilitating discharge of a spheroid 90 (shown in dotted lines in FIG. 1) from the valve 10 in a manner as will be hereinafter set forth.

The valve 10 may be interposed in a pipeline (not shown) in any well known manner such as by welding the end members 18 and 20 to adjacent pipe sections. The weight of the closure disc 46 maintains the closure member 42 in a normally closed position against the valve seat 44 as shown in solid lines in FIG. 1. Prior to placing the pipelines in service the pipeline is normally filled with water by moving the water in the direction indicated by the arrow 92. The pressure of the water being forced into and through the pipeline acts against the closure disc 46 and when this force becomes sufficiently great the closure member 42 will rotate in a direction toward the open position shown in dotted lines in FIG. 1, thus permitting the water to flow through the valve 10 for filling of the pipeline as is well known. This process is normally done to provide a hydrostatic testing of the line in order to assure that the pipeline has been adequately constructed and is in condition for normal service.

Subsequent to this testing the liquid or water must be eliminated or evacuated from the pipeline. In order to do this, spheroids such as the spheroid 90 is normally forced or moved through the pipeline in a reverse direction as indicated by the arrow 94 to push the water from the line. As hereinbefore set forth, the spheroid 90 is of a yieldable construction and the actual cross sectional area thereof is normally slightly larger than the interior cross sectional area of the pipeline thus assuring a tight engagement therebetween for efficiently moving the water from the line. When the fluid and the spheroids are being moved through the pipeline in a reverse direction it is necessary that all the valves 10 interposed in the pipeline be in an open position. In order to accomplish this the shaft 60 may be manually rotated, or rotated by a suitable actuator (not shown), as is well known for moving the closure member 42 into a position adjacent the bumper member 36 as shown in dotted lines in FIG. 1.

As a spheroid 90 enters the end sleeve 20 it will be directed into the sleeve 74 which maintains the spheroid 90 at substantially the same size as that size maintained by the inner periphery of the pipeline. However, when the spheroid leaves the sleeve 74 it may expand slightly since the cross sectional area of this portion of the valve body 12 is of a necessity somewhat larger than the cross sectional area of the pipeline. The force moving the spheroid 90 through the line will cause the spheroid to engage the tapered shoulder 84 of the valve seat 44 whereby the tapered configuration of the shoulder will swedge the spheroid back to the previously compressed size thereof. The spheroid 90 will thus enter the port 14 and pass therethrough for discharge into the succeeding pipe section.

Subsequent to this evacuation operation the clapper or closure member 42 may be moved to the normal closed position thereof whereupon the valve 10 may function in the normal manner for a check valve.

From the foregoing it will be apparent that the present invention contemplates a novel check valve having a substantial portion of the interior thereof of a cross sectional size corresponding to the cross sectional size of the pipeline wherein which the valve is interposed. In addition a tapered shoulder is provided in the valve for facilitating passage of pipeline shperoids in a reverse direction through the valve. The novel valve is simple and efficient in operation and economical and durable.

Whereas the present invention has been described in particular relation to the drawings attached hereto, it should be understood that other and further modifications, apart from those shown or suggested herein, may be made within the spirit and scope of this invention.

What is claimed is:

1. A check valve to be interposed within a pipe line for receiving spheroids therethrough and comprising a housing having substantially aligned inlet and outlet ports of a substantially identical diametrical size corresponding to the diametrical size of the pipeline and providing a fluid passageway through the valve, port means providing access to the interior of the housing, valve seat means provided in the housing, closure means pivotally secured in the housing cooperating with the valve seat for providing alternate open and closed positions for the valve, cover means removably secured on said access port means, bumper means provided on said cover means for limiting movement of the closure member in the opening direction whereby said closure member in the full open position thereof is completely removed from the fluid passageway determined by the aligned inlet and outlet ports for providing full opening of the valve, liner means provided in the housing for reducing the cross-sectional area of a portion of the interior thereof to a size corresponding to the size of the inlet and outlet ports for receiving spheroids moving in a reverse direction through the valve and reducing expansion of the size of the spheroids within the housing, and means provided on said valve seat for facilitating discharge of the reverse moving spheroids from the valve, and wherein the bumper means comprises a substantially semi-cylindrical flange member secured to the cover means and extending into the interior of the valve, the inwardly directed surface defined by the edge of the flange being angularly disposed with respect to the longitudinal axis of the housing to provide said angular position for the closure member in the full open position thereof, a yieldable bumper member element provided on the outer edge of the flange member for engaging the closure means to limit the movement thereof in the opening direction.

* * * * *